(12) United States Patent
Zhu et al.

(10) Patent No.: US 9,223,176 B2
(45) Date of Patent: Dec. 29, 2015

(54) COATING METHOD FOR LIQUID CRYSTAL ALIGNMENT FILM OF TFT-LCD

(75) Inventors: Mei-Na Zhu, Guangdong (CN);
Jian-Jun Zhao, Guangdong (CN);
Hsiang-Yin Shih, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 529 days.

(21) Appl. No.: 13/376,567

(22) PCT Filed: Oct. 11, 2011

(86) PCT No.: PCT/CN2011/080640
§ 371 (c)(1),
(2), (4) Date: Dec. 6, 2011

(87) PCT Pub. No.: WO2013/040813
PCT Pub. Date: Mar. 28, 2013

(65) Prior Publication Data
US 2013/0071559 A1 Mar. 21, 2013

(30) Foreign Application Priority Data
Sep. 21, 2011 (CN) .......................... 2011 1 0282896

(51) Int. Cl.
*B05D 5/00* (2006.01)
*G02F 1/1337* (2006.01)
*G02F 1/13* (2006.01)
*C03C 17/00* (2006.01)

(52) U.S. Cl.
CPC ........ *G02F 1/133711* (2013.01); *C03C 17/001* (2013.01); *G02F 1/13* (2013.01); *B05D 5/00* (2013.01)

(58) Field of Classification Search
CPC ................................... G02F 1/13; B05D 5/00
USPC ............................................ 427/256; 438/30
See application file for complete search history.

(56) References Cited

U.S. PATENT DOCUMENTS

| 5,208,605 | A  | * | 5/1993  | Drake ............................ 347/15 |
| 7,227,606 | B2 | * | 6/2007  | Takeda et al. ................ 349/139 |
| 7,939,132 | B2 | * | 5/2011  | Toyoda ........................ 427/256 |
| 2005/0126410 | A1 | * | 6/2005 | Won et al. ..................... 101/359 |
| 2005/0270328 | A1 | * | 12/2005 | Usui ............................. 347/40 |
| 2006/0262266 | A1 | * | 11/2006 | Vogels et al. ................. 349/156 |

FOREIGN PATENT DOCUMENTS

| CN | 1573447 | 2/2005 |
| CN | 1658050 | 8/2005 |
| CN | 1707335 | 12/2005 |
| CN | 1716053 | 1/2006 |
| CN | 101285968 | 10/2008 |
| CN | 101344684 | 1/2009 |
| CN | 102129140 | 7/2011 |
| JP | 2006007079 | 1/2006 |
| KR | 20080076324 | 8/2008 |

* cited by examiner

*Primary Examiner* — James M Mellott
(74) *Attorney, Agent, or Firm* — Muncy, Geissler, Olds & Lowe, P.C.

(57) ABSTRACT

A coating method for liquid crystal alignment film of TFT-LCD, at least two different sized nozzles are used to perform N nested hollow rectangular coatings, the N nested hollow rectangles are ordered based on 1, 2 to N measurements sequentially from the smallest to the biggest, and a smaller sized nozzle is employed for the Nth nested hollow rectangular coating on an edge.

7 Claims, 4 Drawing Sheets

  
FIG. 5a   FIG. 5b   FIG. 5c
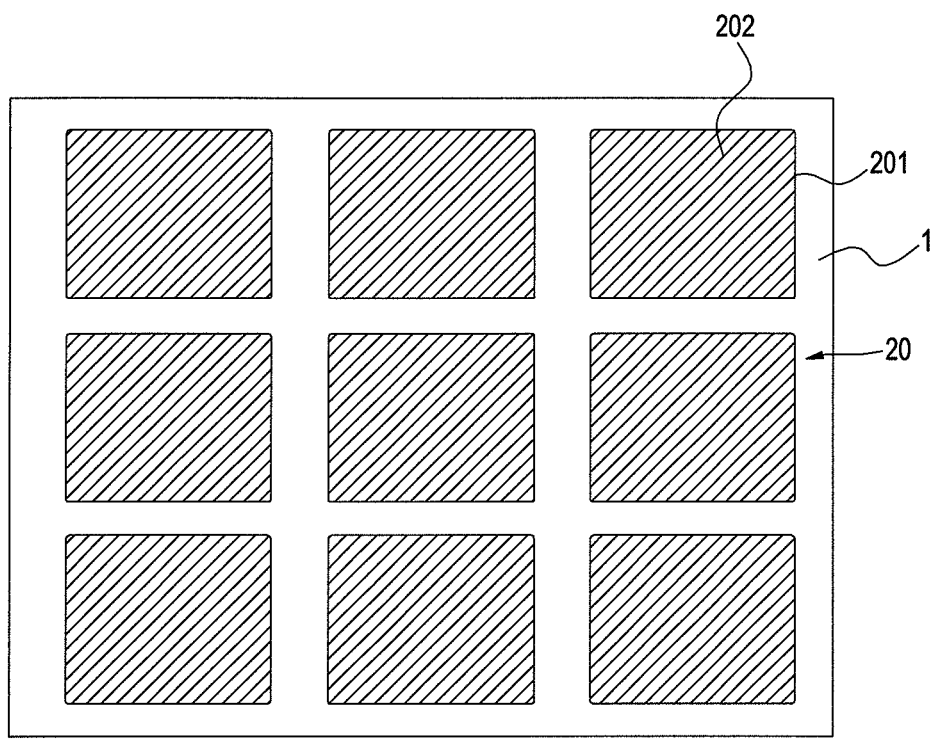
FIG. 6

US 9,223,176 B2

COATING METHOD FOR LIQUID CRYSTAL ALIGNMENT FILM OF TFT-LCD

CROSS-REFERENCE TO RELATED APPLICATION

This application claims priorities of China Patent Application No. 201110282896.3, filed on Sep. 21, 2011, in the State Intellectual Property Office of the People's Republic of China, and PCT application No. PCT/CN2011/080640, filed on Oct. 11, 2011 which is hereby incorporated by reference in its entirety.

FIELD OF THE INVENTION

The present invention relates to a manufacturing technique of liquid crystal display device and more particularly to a coating technique for liquid crystal alignment film of TFT-LCD.

BACKGROUND OF THE INVENTION

Currently, there are mainly two coating methods for liquid crystal alignment film of TFT-LCD: PI (polyimide) roller coating and PI inkjet, and the entire TFT-LCD industry employs both of roller coating and inkjet coating, or one of them.

Referring to FIG. 1, a process for printing technique mainly includes: a polyimide (PI) solution is ejected from a PI nozzle 4 and it drips on a turning metal roller 3, and then a scraper 5 is used to scrape excessive PI solution. The metal roller 3 rotates and is in contact with a plate cylinder 6, and the PI solution is stored on a printing plate 7 which is attached on the plate cylinder 6. Then, the plate cylinder 6 rotates and is in contact with a glass substrate 1 on a printing stage 2, finally the PI solution is printed on the glass substrate 1. The roller coating technique has the following drawbacks: cumbersome equipment, poor mobility, large consumption of consumables (dummy substrates and printing plates), thick film which is difficult to adjust, complicated operations, low PI usage percentage, high operating costs and common deficiencies easily caused by polluted printing plates.

Referring to FIGS. 2 and 3, PI printing is controlled by using deformation of piezoelectric ceramics, so that a PI drip 8 is dripped from a nozzle hole 9 and land on a glass substrate 1 disposed on a printing stage 2. The PI drip 8 is then evenly spread on the glass substrate 1, and an even film is formed by diffusion of the PI drip 8. This technical method has the following drawbacks: large uneven area of thick edges of the film, small nozzle hole which is easy to be clogged, interval difference of the nozzle hole 9 and uneven spreading which will produce deficient products with uneven inner lines and inner surfaces. The most serious deficiency is that, the PI solution is unable to be spread evenly to form a film when a segmental difference of the substrate surface is too large. As a result, product quality is substantially decreased and possible large quantity of rejected products. Furthermore, halo area is also an important factor to affect the printing quality. Therefore, the conventional coating and inkjet techniques need to be improved.

SUMMARY OF THE INVENTION

The present invention relates to a manufacturing technique of liquid crystal display device and more particularly to a coating technique for liquid crystal alignment film of TFT-LCD.

An object of the present invention is to provide a coating method for liquid crystal alignment film of TFT-LCD, so that coating of PI solution can be executed using a convenient and fast method of high quality.

In order to achieve the abovementioned object, the present invention provides a coating method for liquid crystal alignment film of TFT-LCD, at least two different sized nozzles are used to perform N nested hollow rectangular coatings, the N nested rectangles are ordered based on 1, 2 to N measurements sequentially from the smallest to the biggest, a smaller sized nozzle is employed for the Nth nested hollow rectangular coating on an edge.

By employing two different sized nozzles to perform the N nested hollow rectangular coatings, a smaller sized nozzle is employed for a (M+1)th to a Nth nested hollow rectangular coatings, a larger sized nozzle is employed for a 1st to a Mth nested hollow rectangular coatings.

By employing three different sized nozzles to perform the N nested hollow rectangular coatings, a smallest sized nozzle is employed for the Nth nested hollow rectangular coating, a largest sized nozzle is employed for a 1st to a Mth nested hollow rectangular coatings, a middle sized nozzle is employed for a (M+1)th to a (N−1)th nested hollow rectangular coatings.

Comparing with the conventional techniques, a coating method for liquid crystal alignment film of TFT-LCD of the present invention employs at least two different sized nozzles to perform the hollow rectangular coatings, so that coating of PI solution can be executed using a convenient and fast method of high quality.

BRIEF DESCRIPTION OF THE DRAWINGS

FIG. 5 is an illustration of different sized nozzles employed in a coating technique for liquid crystal alignment film of TFT-LCD of the present invention; and FIG. 6 is a structural illustration of a liquid crystal alignment film of TFT-LCD produced by using a coating technique of the present invention.

DETAILED DESCRIPTION OF THE INVENTION

The present invention will become more fully understood by reference to the following detailed description thereof when read in conjunction with the attached drawings.

Figure 1:
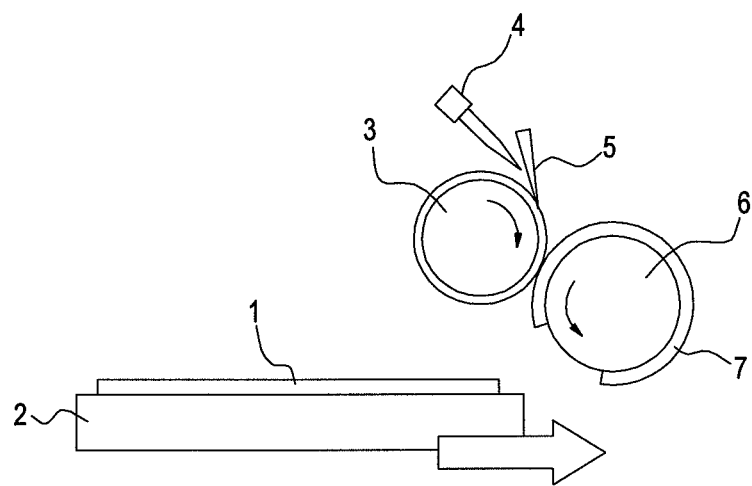
FIG. 1 is an illustration of a conventional roller coating technique for liquid crystal alignment film of TFT-LCD.
Figure 2:
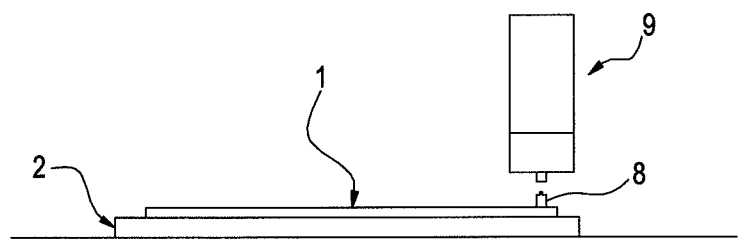
FIG. 2 is an illustration of a conventional inkjet coating technique for liquid crystal alignment film of TFT-LCD.
Figure 3:
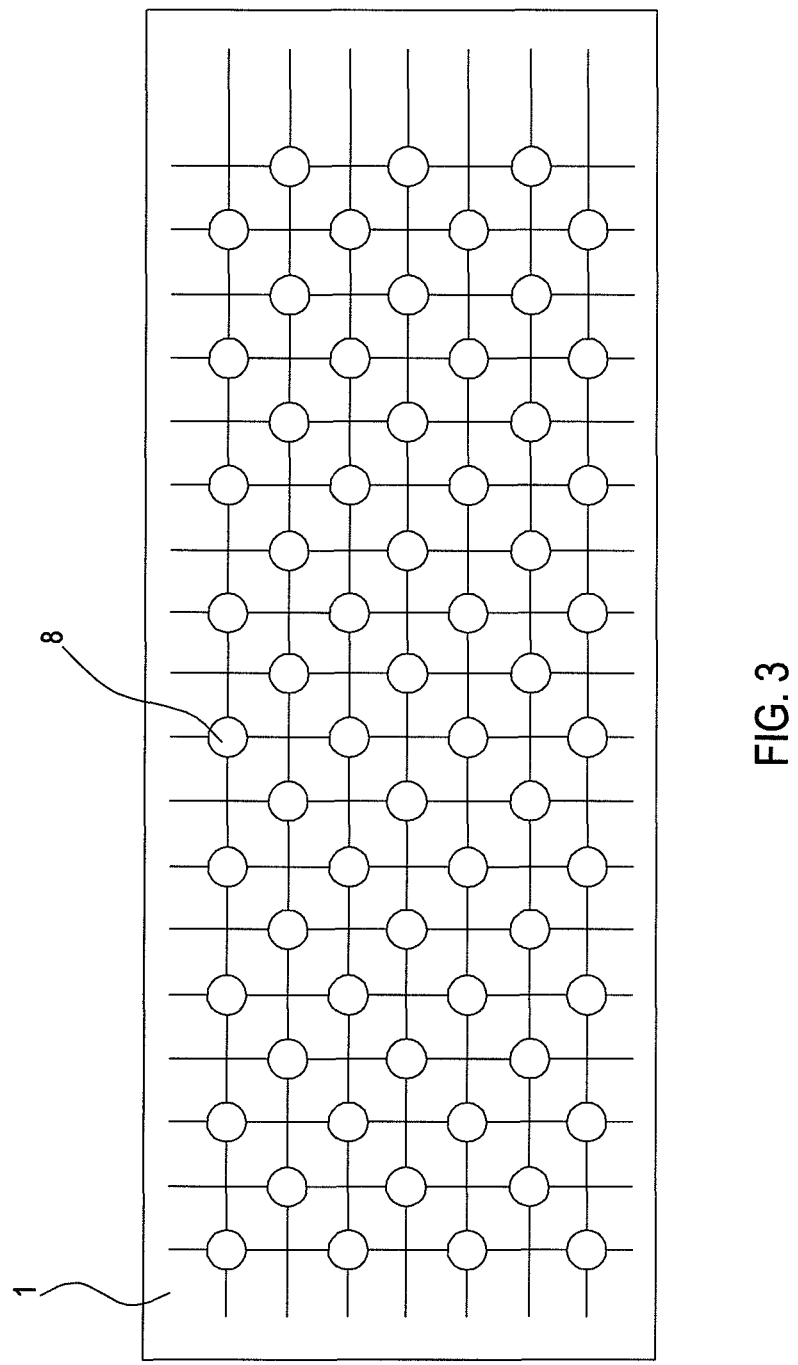
FIG. 3 is a structural illustration of an alignment film produced by using a conventional inkjet coating technique.
Figure 4:
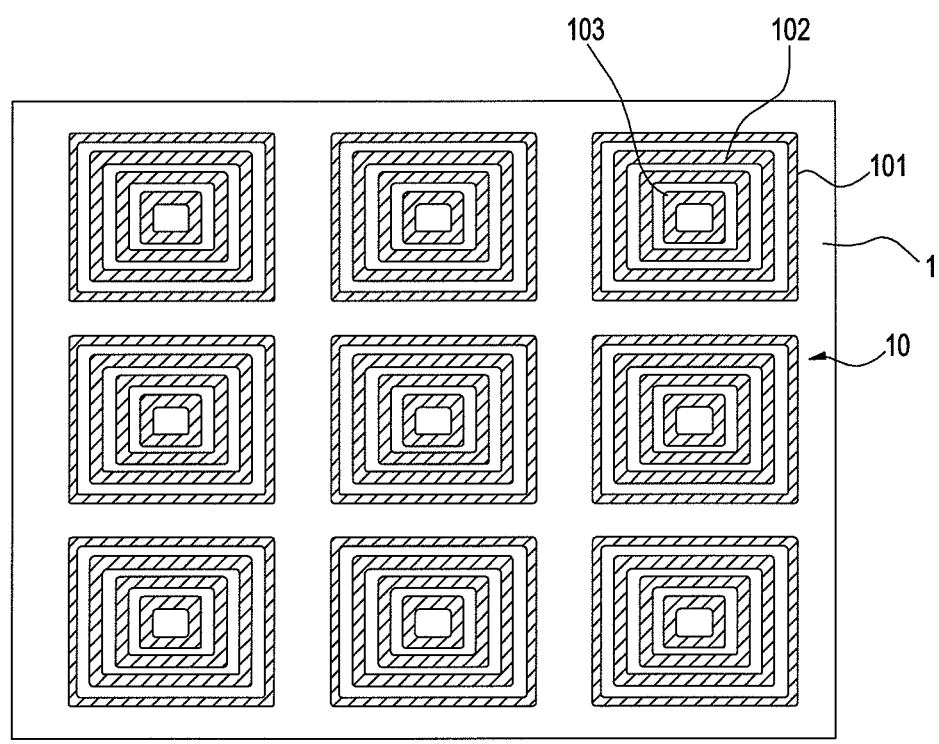
FIG. 4 is an illustration of a coating technique for liquid crystal alignment film of TFT-LCD of the present invention.

Referring to FIG. 4, the present invention provides a coating method for liquid crystal alignment film of TFT-LCD, and at least two different sized nozzles are used to perform N nested hollow rectangular coatings. The N nested rectangles are ordered based on 1, 2 to N measurements sequentially from the smallest to the biggest, a smaller sized nozzle is employed for the Nth nested hollow rectangular coating on an edge. Coating is divided into a number of coating areas 10 performed on a glass substrate 1. The N nested hollow rectangular coatings can be performed from inside to outside, or from outside to inside. The nozzles are in a hole shape, and N is not less than 4. The hollow rectangular coatings are achieved by continuous linear coating. Each of the hollow rectangular coatings is a rectangle formed by a continuous connection of lines.

In an embodiment of the present invention, three different sized nozzles can be used to perform the N nested hollow rectangular coatings. The hollow rectangular coatings are performed on a number of the coating areas 10 on the glass substrate 1 according to certain requirements. In each of the coating areas 10, a Nth rectangle 101 which is a hollow rectangular coating on an edge, is performed using a smallest sized nozzle (shown in FIG. 5*c*). A 1st to a Mth rectangles 103 which are the M hollow rectangular coatings in a middle, are performed using a largest sized nozzle (shown in FIG. 5*b*). A (M+1)th to a (N−1)th rectangles 102 which are a number of other hollow rectangular coatings, are performed using a middle sized nozzle (shown in FIG. 5*a*).

Referring to FIG. 6, after coating is done, rectangular patterns of the PI solution are spread to form a solid PI film 20, each of the solid PI films 20 is defined by a boundary 201 and a solid area 202 inside the boundary 201.

It should be noted that, in another embodiment of the present invention, two different sized nozzles can be used to perform the N nested hollow rectangular coatings. A (M+1)th to a Nth rectangles which are a number of hollow rectangular coatings on the edges, are performed using a smaller sized nozzle. A 1st to a Mth rectangles which are the M hollow rectangular coatings in a middle, are performed using a larger sized nozzle. Furthermore, four or more different sized nozzles can also be used to meet practical requirements of film forming.

Comparing with the conventional techniques and according to a coating method for liquid crystal alignment film of TFT-LCD of the present invention, by having the edges coated with thinner lines and areas other than the edges coated with wider lines, halo areas can be effectively reduced, which are caused by the PI solution on the areas other than the edges flow toward the edges because the PI solution on the edges are dried faster. In addition, the present invention employs the spreading method of PI lines instead of dripping of PI, so that edge waves can be effectively reduced, therefore coating of the PI solution can be executed using a convenient and fast method of high quality.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A coating method for liquid crystal alignment film of TFT-LCD, comprising the step of:
   using at least two different sized nozzles to perform a plurality of nested rectangular coatings,
   wherein a rectangular gap is provided between any two rectangular coatings,
   wherein the nested rectangular coatings are achieved by continuous connection of lines so as to reduce edge waves,
   wherein the nested rectangular coatings comprise a 1st nested rectangular coating, a 2nd nested rectangular coating to a Nth nested rectangular coating, and sizes of the 1st, 2nd to the Nth nested rectangular coatings are arranged sequentially from the smallest to the biggest, and
   wherein the 1st rectangular coating is innermost, the Nth nested rectangular coating is the outermost, and a smaller sized nozzle is employed for the Nth nested rectangular coating; and
   spreading the plurality of nested rectangular coatings to form a single coating.

2. The coating method as claimed in claim 1, wherein using two different sized nozzles to perform the nested rectangular coatings, the smaller sized nozzle is employed for a (M+1)th to the Nth nested rectangular coatings, a larger sized nozzle is employed for the 1st to a Mth nested rectangular coatings.

3. The coating method as claimed in claim 1, wherein using three different sized nozzles to perform the nested rectangular coatings, the smaller sized nozzle is employed for the Nth nested rectangular coating, a largest sized nozzle is employed for a 1st to a Mth nested rectangular coatings, a middle sized nozzle is employed for a (M+1)th to a (N−1)th nested rectangular coatings.

4. The coating method as claimed in claim 1, wherein the nested rectangular coatings are performed from an inside to an outside.

5. The coating method as claimed in claim 1, wherein the nested rectangular coatings are performed from an outside to an inside.

6. The coating method as claimed in claim 1, wherein the N is not less than 4.

7. The coating method as claimed in claim 1, wherein coating is divided into a number of coating areas performed on a glass substrate.

\* \* \* \* \*